Patented Mar. 1, 1927.

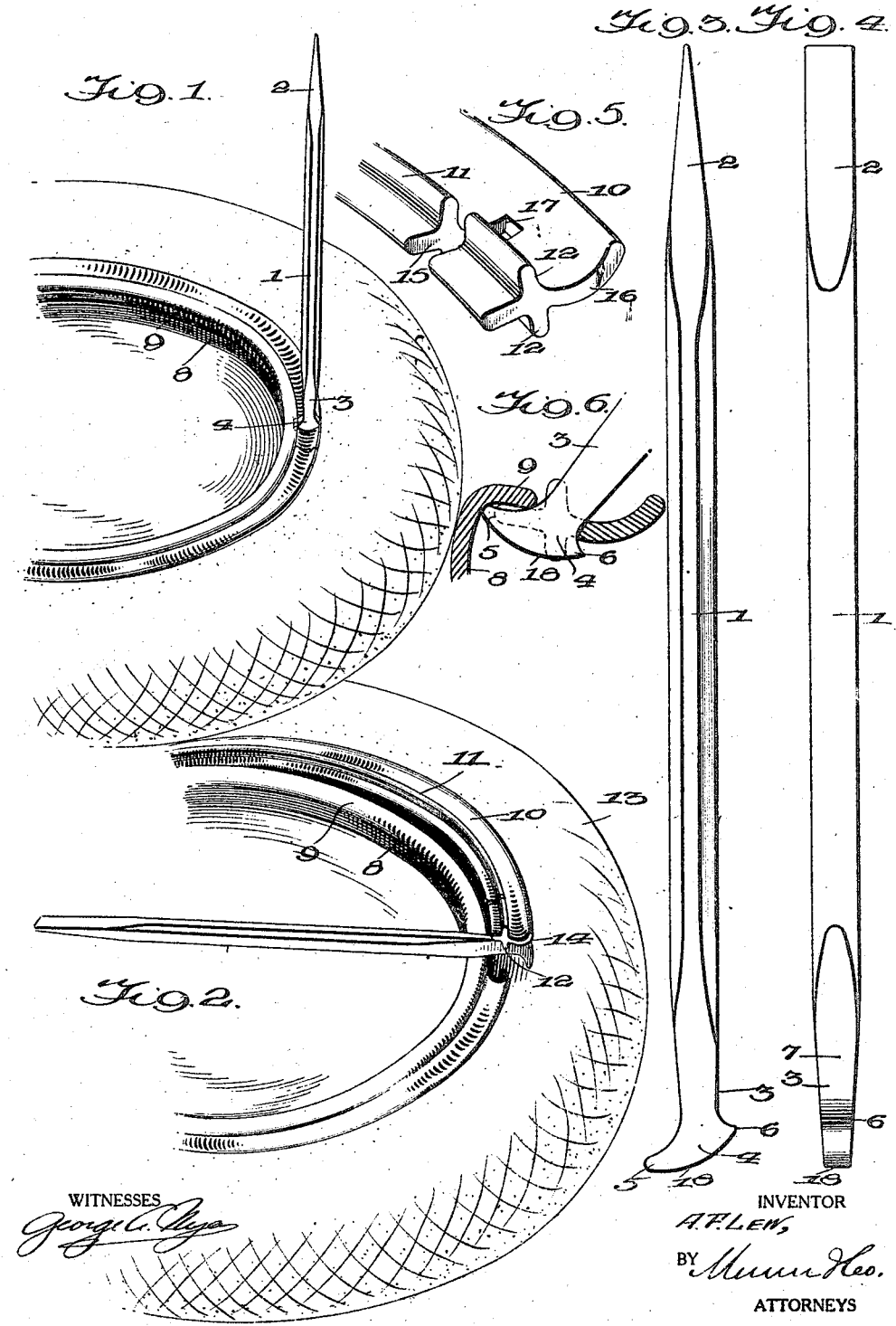

1,619,426

UNITED STATES PATENT OFFICE.

ALBERT FREDRIC LEW, OF BAKER, OREGON.

TIRE TOOL.

Application filed December 10, 1924. Serial No. 755,010.

This invention relates to a tire tool and has for its object the provision of a device for removing locking rings of rims of automobile wheels.

A further object of the invention is the provision of a simple and efficient tool for engaging a socket of a locking ring of an automobile wheel so that when the tool is properly operated the same may be readily forced beneath the ring and lifted out of its locking position.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claim.

In the drawings:

Figure 1 is a view in perspective of an automobile tire showing a tool constructed according to the principles of my invention in the first stage of application.

Figure 2 is a view in perspective of an automobile wheel showing the tool in the latest stages of removing the locking ring.

Figure 3 is a side view in elevation of the tool.

Figure 4 is a front view in elevation of the same.

Figure 5 is a fragmentary perspective view of an end of the locking ring.

Figure 6 is a sectional view of the ring through a slot showing the tool in operative position.

Referring more particularly to the drawings, 1 designates a handle of the tool having one end 2 bevelled at its opposite faces to provide an edge sufficiently reduced to be employed in connection with certain operations in the removal of a tire. The opposite end of the handle is provided with a shank 3 which merges into an enlarged portion 4 having a toe 5 and a heel 6. The last mentioned end of the tool is sheared at the shank 3 as shown at 7 to aid in providing a reduced shank whereby the tool may be more properly operated as will be presently explained.

The handle may be cylindrical in shape or have its surface defaced to provide a plurality of faces whereby the tool will be more firmly held in the hand.

The tool is more especially adapted for removing the locking rings from the well known Budd-Michelin automobile wheel but the tool may be employed equally well on other makes.

The form of wheel and rim shown in Figures 1 and 2 and in which 8 designates the rim having peripheral flanges 9 along its edges and split locking rings 10 adapted to be seated within the rim and having a bead 11 adapted to lie in close contact with the outer edge of the flange 9 when in locked position. A bead 12 is formed upon the inner face of the ring and is adapted to engage the usual bead on the outer casing 13. The ring has a curved portion 14 adapted to be seated within the annular groove of the tire located between the bead of said tire and the main body of the casing.

The ring has a slot 15 formed adjacent one end 16 of the split ring 10. The slot extends through the bead 11 and partially into the curved member 14 leaving sufficient metal at the end of the slot for maintaining the end of the ring against distortion or breakage.

In applying the tool in use, the toe 5 is first inserted in the slot 15 and engaged beneath the curved flange 9 of the rim 8 in about the position shown in Figure 1. The tool is then swung outwardly to the position shown in Figure 6 in order to force the heel 6 beneath the ring at the outer end 17 of the slot, the toe 5 acting as a pivot against the rim flange 9 in this movement. The tool is then swung inwardly to the position shown in Figure 2 and since its enlarged end is beneath the ring and the tool has a fulcrum upon the rim flange 9, the ring will be forced out of position and free of the flange as plainly seen in Figure 2, where it is necessary, on account of rust for instance, tapping of the tool with a hammer or other implement will serve to more readily free the ring. When the ring is thus freed its complete withdrawal becomes an easy matter.

To replace the ring on the rim, the ring is placed in position as far as possible on the inner side of the flange 9 of the rim until the end 16 of the ring is the only portion of the ring out of position. The tool is then inserted with the toe 5 under the rim and by moving the outer end 2 of the tool downwardly and away from the center of the wheel the ring is immediately forced into place.

The relatively reduced end 2 is adapted to be employed for prying the rim or outer casing loose when it may be required.

The outer end of the tool, as shown at 18, is curved convexly between the heel 6 and toe 5 so that when the tool is engaged in the slot 15 and moved the arcuately shaped portion 18 will aid in urging the tool in position when the handle 1 is radially operated.

What I claim is:

A tire tool for removing locking rings from rims comprising a bar reduced adjacent one end and provided at said end with an enlarged foot consisting of a toe portion projecting in one direction and having a rounded terminal, and a heel portion projecting in the opposite direction and having a relatively sharp terminal, the end surface of said enlarged foot being rounded along an arc extending continuously and uniformly between the terminals of the toe and heel portions, said toe and heel portions projecting beyond the corresponding adjacent surfaces of the bar and merging into the said surfaces of the bar along regular concave lines adapting the reduced portion of the bar adjacent to the said head to conform to the curvature of a rim and its locking ring when the said bar is extended at its reduced portion therebetween.

ALBERT FREDRIC LEW.